Feb. 3, 1925.

G. E. DICK 1,524,733

AUTOMATIC PRESSURE CONTROL

Filed July 9, 1923    2 Sheets-Sheet 1

G. E. Dick, Inventor

By C. A. Snow & Co.

Attorney

Feb. 3, 1925.
G. E. DICK
1,524,733
AUTOMATIC PRESSURE CONTROL
Filed July 9, 1923
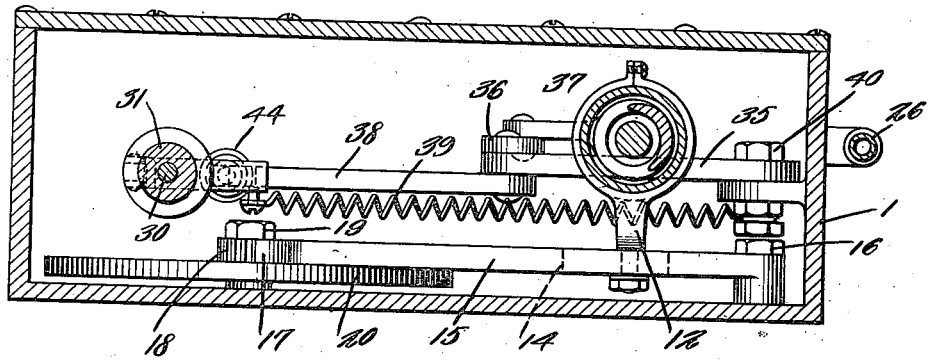
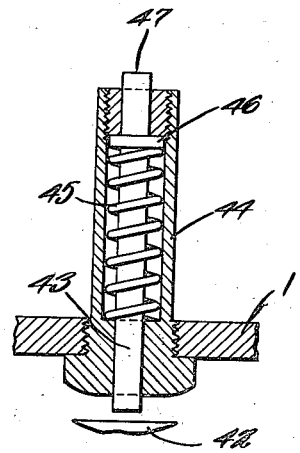

Patented Feb. 3, 1925.

1,524,733

UNITED STATES PATENT OFFICE.

GUY E. DICK, OF CHIPPEWA FALLS, WISCONSIN.

AUTOMATIC PRESSURE CONTROL.

Application filed July 9, 1923. Serial No. 650,563.

*To all whom it may concern:*

Be it known that I, GUY E. DICK, a citizen of the United States, residing at Chippewa Falls, in the county of Chippewa and State of Wisconsin, have invented a new and useful Automatic Pressure Control, of which the following is a specification.

This invention relates to apparatus for automatically controlling pressure of air, gas, and liquid, and while the apparatus is useful wherever air, gas or liquid is employed in the operation or control of machinery, it has been found especially advantageous for use in connection with apparatus employed for supplying air to automobile tires.

One of the objects of the invention is to provide an apparatus of this character which can be set to produce any predetermined pressure, the supply being cut off automatically when the said pressure is reached.

A further object is to provide apparatus of this character which is simple, durable and compact and can be adjusted readily to vary the pressure in the tire or other structure supplied therefrom.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Fig. 2 is a section on line 2—2, Fig. 1.

Fig. 3 is an enlarged section through the striker of the alarm.

Figure 1:
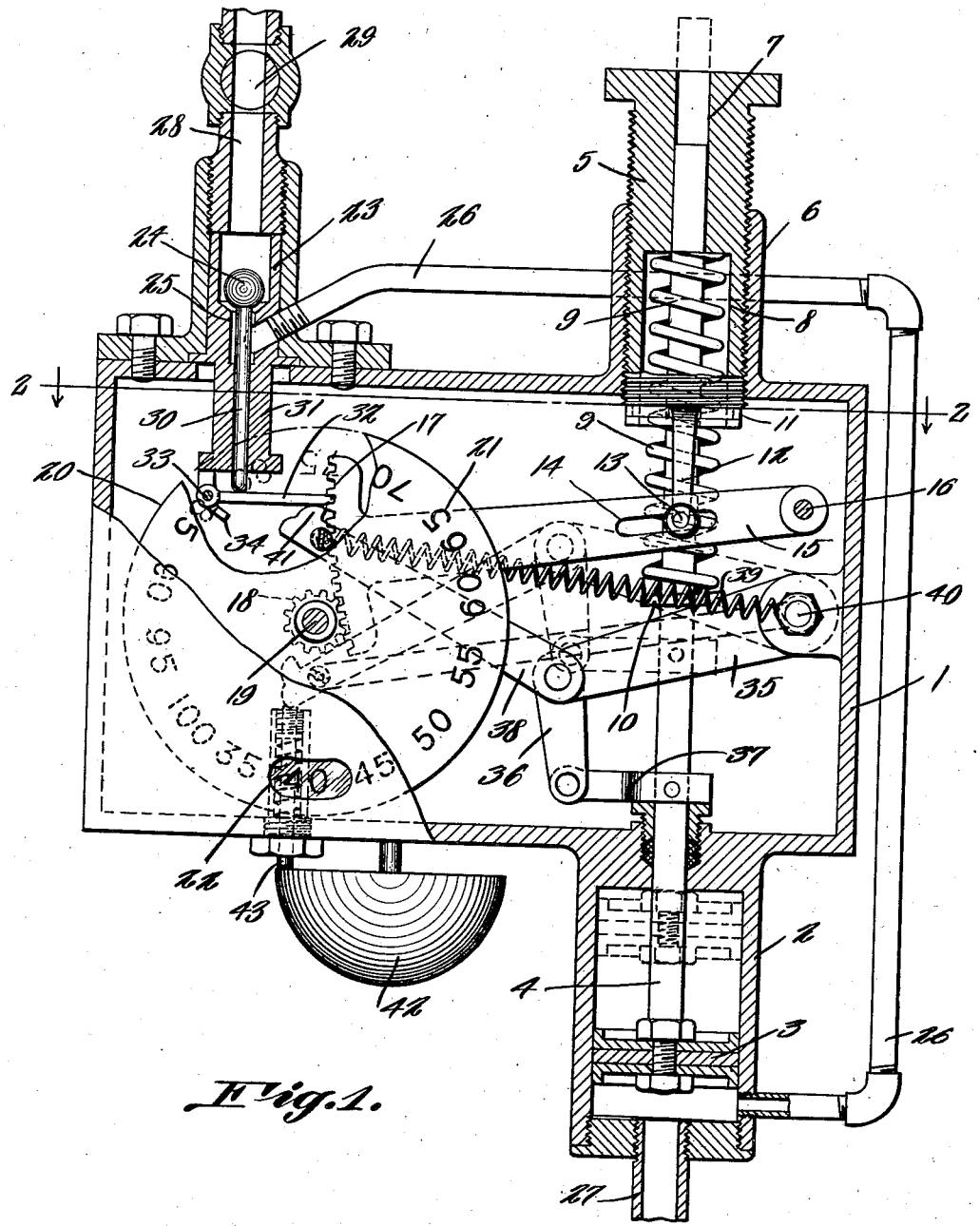
Figure 1 is a view partly in elevation and partly in section of the complete apparatus, one of the positions of the valve shifting mechanism being indicated by broken lines.

Referring to the figures by characters of reference 1 designates a housing having a cylindrical extension 2 in which a piston 3 is mounted for reciprocation. This piston has a rod 4 slidable within the inner end of the cylinder and extending across the housing 1 into a screw plug 5 mounted in a sleeve 6 extending from the housing. This screw plug has a central longitudinal bore 7 in which the rod 4 reciprocates and a counter-bore 8 extends into the plug from the inner end thereof and houses one end of a coiled spring 9. One end of this spring bears against plug 5 while the other end bears against a collar 10 on the rod 4.

The screw plug 5 has its lower or inner end swiveled in a ring 11 and from this ring is extended an arm 12 having a pin 13 that projects into a longitudinal slot 14 formed in a lever 15. This lever is fulcrumed in the housing as shown at 16 and one end of the lever has a segmental rack 17 that meshes with a gear 18. The gear is secured to a shaft 19 extending transversely of and journaled within the housing and secured to this shaft is a disk 20 on which is arranged a circular series of numerals shown generally at 21. These numerals are adapted, when the disk is rotated, to be displayed successively within a window 22 provided in one wall of the housing. The numerals on the disk indicate pounds of pressure or other units of measure and the parts are so proportioned that when the screw plug 5 is adjusted relative to the housing so as to increase or reduce the compression of spring 9, lever 15 will be correspondingly moved by the pin 13 so as to expose in the window 22 a numeral indicating the amount of pressure necessary to compress the spring.

Mounted on one wall of the housing 1 is a valve casing 23 in which is located a valve 24 adapted normally to close a port 25. This port opens into a by-pass 26 that communicates with the outer end portion of the cylindrical extension 2 and extending from the outer end portion of the extension is an outlet pipe 27 adapted to be placed in communication with the tire or other structure to which air or the like is to be supplied.

A supply pipe 28 opens into the valve casing 23 and may be provided at any suitable point with a valve 29.

A lifting pin 30 is slidably mounted under the valve 24 and is loose in the port 25, this lifting pin being mounted within a suitable guide 31 in housing 1. The lower end of the lifting pin normally rests on a lifting finger 32 pivotally mounted on the guide 31 as shown at 33 and limited in its downward movement by a stop 34.

Fulcrumed in the housing 1 is a lever 35 one end of which is connected by a link 36 to an arm 37 secured to and moving with the rod 4. A link 38 is pivotally connected to the lever 35 at its point of connection with link 36 and the free end portion of this link 38 is connected by a coiled spring 39 to the pivot or fulcrumed end 40 of lever 35. The free end of the link 38 has a cam projection 41 adapted to bear against the finger 32 when the rod 4 is in its lowermost position, link 38 being held in its upwardly inclined position by the pull of spring 39 as will be seen by referring to Fig. 1, this spring being disposed along a line extending above the point of connection between lever 35 and the link 38.

Mounted on one wall of the housing 1 is the bell 42 and a striker pin 43 is slidably mounted in a casing 44 carried by the housing. This casing supports the pin where it will strike the periphery of the bell. A spring 45 is mounted on the pin and bears against a collar 46 carried by the pin so as to yieldingly support the pin normally out of contact with the bell. One end of the pin, indicated at 47, is thus normally supported in the path of the free end of the link 38 as indicated by broken lines in Fig. 1.

Under normal conditions the parts of the apparatus are positioned as shown by full lines in Fig. 1 and the valve 29 is closed. It is to be understood that the supply pipe 28 is in communication with a storage tank or the like containing air or other fluids under a higher pressure than that to be supplied to the tire or other structure. The plug 5 is adjusted so as to reduce or increase the compression of spring 14, thus to set the apparatus to produce a pressure which will be indicated by the exposed numeral in the window 22. After this adjustment of the parts the valve 29 is opened. The fluid under pressure will promptly pass the lifted valve 24 and enter the by-pass 26 and cylindrical extension 2. The fluid will flow through the outlet 27 and when the pressure in the tire or other structure being filled approaches the predetermined pressure, the piston 3 will be shifted longitudinally against the action of spring 9 and thereby cause the link 36 to thrust against the lever 35. As the point of connection between lever 35 and link 38 passes the dead center the spring 39 which is placed under increased tension during this action, will suddenly retract and swing link 38 downwardly so as to move out of contact with finger 32 and move in contact with the striker pin 43. Thus valve 24 will drop to its seat and cut off the supply of air or the like to the extension 2 and at the same time bell 42 will be sounded. Valve 29 is then shut, pipe 27 is disconnected from the part to which pressure has been supplied and the spring 9 will return the various parts of the apparatus to their initial positions as illustrated in full lines in Fig. 1. Thus the apparatus will be set to repeat the operation described.

What is claimed is:—

1. In apparatus of the class described the combination with a pressure inlet, a pressure outlet, and a connection therebetween, of a valve for controlling the flow of pressure from the inlet to the outlet, a shiftable element mounted for actuation by pressure at the outlet, adjustable resilient means for retarding the actuation of said element and for holding the element normally at one limit of its movement, a lever shiftable by said element, a link pivotally connected thereto, a resilient connection between the free end portion of the link and the fulcrum portion of the lever for holding said link in either of two positions relative to the lever, and means actuated by the spring controlled link for shifting the valve and releasing it when the pressure operated element is brought to either limit of its movement, thereby to control the flow of pressure in the outlet.

2. In apparatus of the class described, the combination with a pressure inlet, a pressure outlet, and a by-pass connection between the inlet and outlet, of a piston mounted for actuation by the pressure at the outlet, adjustable resilient means for retarding the movement of the piston under pressure and for holding it normally at one limit of its movement, a valve for closing communication between the pressure inlet and the by-pass, lifting means for unseating the valve, a lever, a connection between the piston and the lever for shifting said lever to either of two positions, a link pivotally connected to the lever, a resilient connection between the outer end of the link and the fulcrum portion of the lever, said connection constituting means for holding the link at either of two positions relative to the lever, said link when in one of said positions constituting means for engaging and supporting the lifting means to hold the valve unseated, said valve being released and movable to its seat when the link is in its other position relative to the lever.

3. In apparatus of the class described, the combination with a pressure inlet, a pressure outlet, and a by-pass connection between the inlet and outlet, an audible alarm, means for sounding the same, a valve for closing communication between the pressure inlet and the by-pass, lifting means therefor, a lever, a link pivotally connected to the lever, a resilient connection between the free end portion of the link and the fulcrum portion of the lever, said link projecting between the lifting means and the alarm sounding means, means operated by pressure at the outlet for shifting the lever to move its point of connection with the link in either of two directions past the dead center, said resilient connection constituting means for abruptly actuating the link to engage the lifting means or the alarm sounding means when said point of connection is moved past the dead center, and adjustable resilient means for controlling the acuation of the lever by the pressure operated means.

4. In apparatus of the class described, the combination with a pressure inlet, and a pressure outlet in communication therewith, of a pressure operated element adjacent the outlet, adjustable means for resiliently retarding the movement of said element under pressure, means operated by said adjusting means for indicating the pressure required to actuate the element, a valve for closing communication between the inlet and the outlet, an alarm, and means operated by the movement of said element to either extreme position for abruptly opening the valve or for releasing the valve and and sounding the alarm respectively.

5. The combination with a pressure supply, a cylinder in communication therewith, and a valve for controlling communication with the cylinder, of a lever, a link pivotally connected thereto, a spring connection between the free end portion of the link and the fulcrum portion of the lever, valve unseating means including a valve engaging pin and a finger movably engaging the pin, said spring constituting means for holding the free end portion of the link normally pressed against the finger to hold the valve unseated, pressure operated means for shifting the lever to move its point of connection with the link past the dead center, said spring constituting means for shifting the link to its other extreme position when its point of connection is moved past the dead center, thereby to release the valve, and a signal device actuated by the link when releasing the valve.

In testimony that I claim the foregoing as my own, I have hereto affixed my signature in the presence of two witnesses.

GUY E. DICK.

Witnesses:
 THEO. A. WILLENBOCKEL,
 DAN J. DOWNEY.